United States Patent
Wagner et al.

(10) Patent No.: US 10,248,147 B2
(45) Date of Patent: Apr. 2, 2019

(54) POWER SUPPLY WITH VARIABLE CONFIGURABLE CURRENT LIMIT

(71) Applicant: Motorola Mobility LLC, Chicago, IL (US)

(72) Inventors: Daniel H Wagner, Grayslake, IL (US); Edward D Brann, Naperville, IL (US); Mark Carlson, Arlington Heights, IL (US); Robert M Johnson, Lake Zurich, IL (US); Daniel S Rokusek, Long Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 392 days.

(21) Appl. No.: 14/943,594

(22) Filed: Nov. 17, 2015

(65) Prior Publication Data
US 2017/0139434 A1 May 18, 2017

(51) Int. Cl.
*G06F 1/26* (2006.01)
*G05F 1/66* (2006.01)
*G05B 15/02* (2006.01)

(52) U.S. Cl.
CPC ............... *G05F 1/66* (2013.01); *G05B 15/02* (2013.01)

(58) Field of Classification Search
CPC .................................. G05F 1/66; G05B 15/02
USPC ....................................................... 700/298
See application file for complete search history.

(56) References Cited

U.S. PATENT DOCUMENTS

| | | | |
|---|---|---|---|
| 2005/0111242 A1* | 5/2005 | Oh | H02M 3/33507 363/21.07 |
| 2007/0201294 A1 | 8/2007 | Ozawa et al. | |
| 2016/0134186 A1 | 5/2016 | Saint-Pierre et al. | |
| 2017/0005499 A1 | 1/2017 | Zhang et al. | |

FOREIGN PATENT DOCUMENTS

| | | |
|---|---|---|
| CN | 101026335 A | 8/2007 |
| CN | 103457465 A | 12/2013 |
| CN | 103762691 A | 4/2014 |

OTHER PUBLICATIONS

USB, "Universal Serial Bus Power Delivery Specification", Revision 2.0, V1.1., May 7, 2015, 544 pages.
Combined Search and Examination Report under Sections 17 and 18(3) for Great Britain Patent Application No. GB1618924.3 dated Mar. 17, 2017.
Translation of Official Action from Chinese Patent Application No. 201611197445.9 dated Aug. 29, 2018.

* cited by examiner

*Primary Examiner* — Tha-O H Bui
(74) *Attorney, Agent, or Firm* — Amerson Law Firm, PLLC

(57) ABSTRACT

A power supply includes a connector, a power conversion controller to generate a power supply signal at the connector, and a communication and control processor. The communication and control processor is to receive a set of current control parameters including a current limit over a communication link in the connector, receive measurements of current and voltage of the power supply signal, and generate a drive signal for controlling the power conversion controller based on the received current control parameters and the measurements of the current and the voltage.

20 Claims, 3 Drawing Sheets

POWER SUPPLY WITH VARIABLE CONFIGURABLE CURRENT LIMIT

BACKGROUND

Field of the Disclosure

The present disclosure generally relates to powering electronic devices, and more particularly, to a power supply with a variable configurable current limit that may be configured by a load device.

Description of the Related Art

Power supplies provide power to charge the batteries and to provide power to electronic devices. The rate at which a load device can charge its battery depends on the current supplied by power supply. A higher current equates generally to a shorter charging time. Typically, when charging, the load device may be configured to draw the maximum allowed current from the power supply. However, the current level of the power supply signal also affects the amount of heat generated in the load device by its charging circuitry and battery. Other entities in the load device also generate heat, such as the active computing components (e.g., processor, memory, transceiver, etc.) that support operation of the device. The internal temperature of the load device and the external temperature felt by a user handling the device (i.e., skin temperature) is affected by all of the heat generating entities in the device. Performance limits (e.g., maximum processor speed) are typically set for a load device so that the internal and external temperatures do not exceed thresholds. These limits are set based on worst case thermal conditions, such as maximum processing load, maximum charging rate, etc. A load device can be equipped with functionality to control its processing activities for thermal mitigation, however, the heat component from the power supply is generally fixed based on the current supplied by the power supply.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
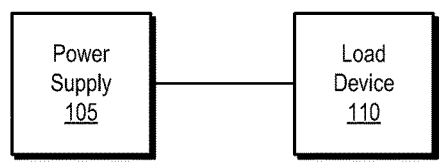
FIG. 1 is a block diagram of a computing system in accordance with some embodiments.
Figure 2A:
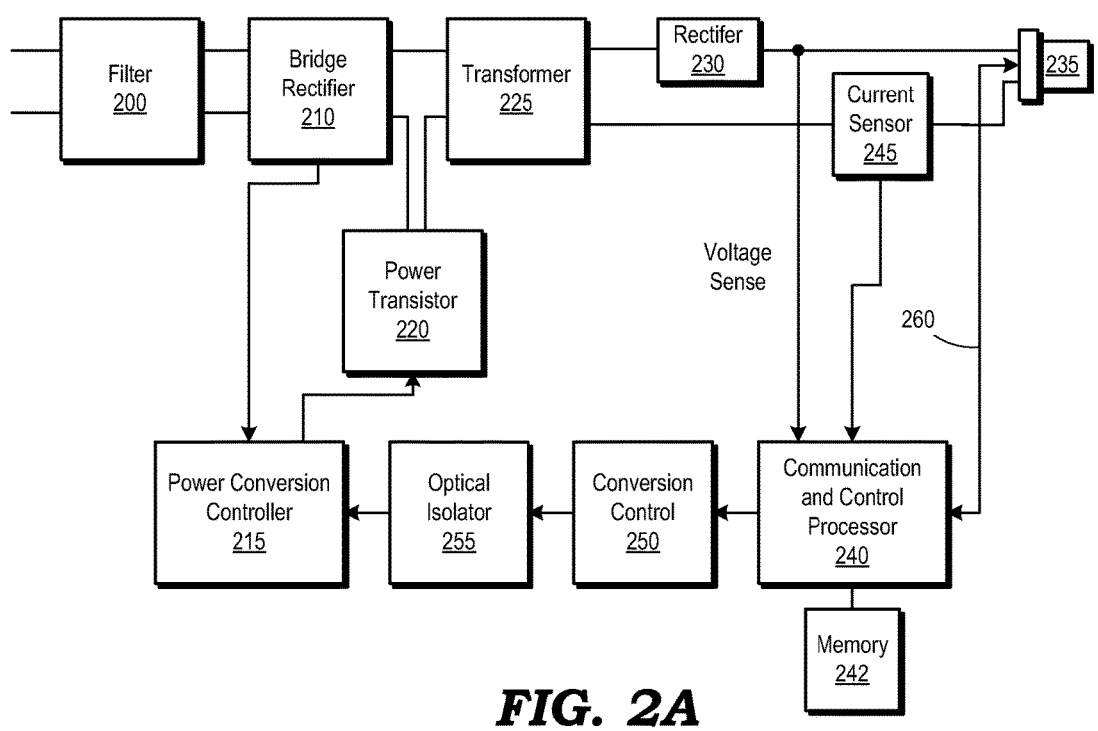
FIG. 2A is a block diagram of a collapsible power supply in the system of FIG. 1 that enables continuously variable output current limiting in accordance with some embodiments.
Figure 2B:
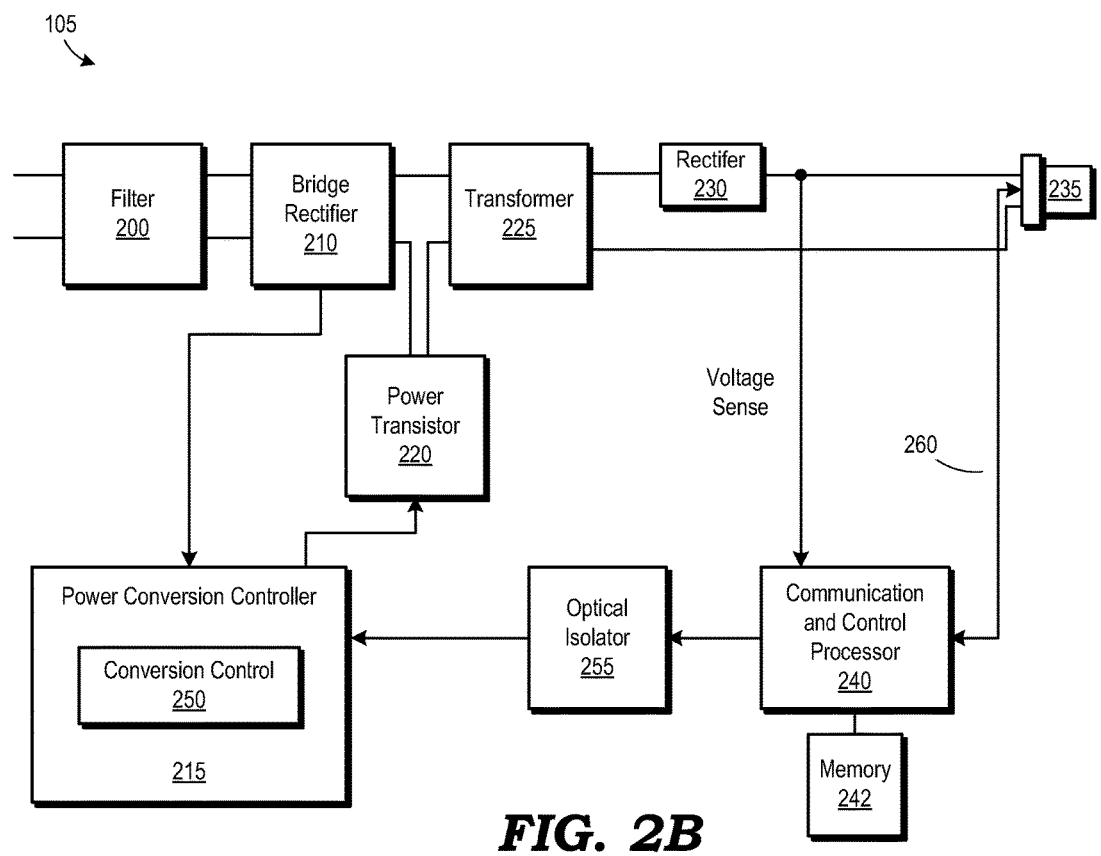
FIG. 2B is a block diagram of an alternative embodiment of the collapsible power supply in the system of FIG. 1 enabling retention of output protection mechanisms through fault conditions in accordance with some embodiments.
Figure 3:
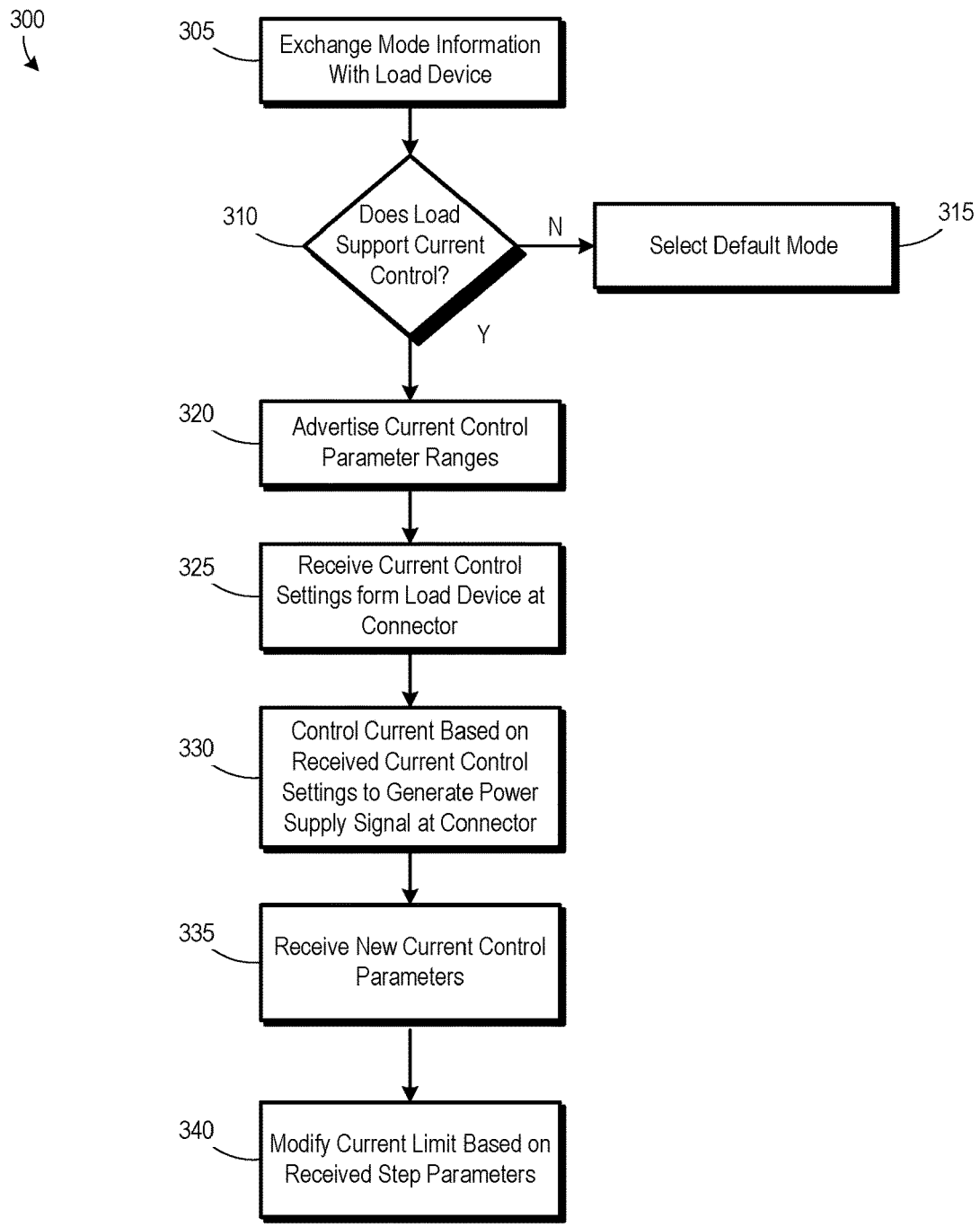
FIG. 3 is a flow diagram of a method for configuring current parameters of a power supply in accordance with some embodiments.

FIGS. 1-3 illustrate example circuits and techniques for a power supply for powering a module that may use a rechargeable battery. The power supply supports a variable configurable current limit that may be specified by a connected load device. The power supply includes a communication and control processor that exchanges messages with the load device to configure a current limit parameter and parameters related to changes in the current limit, such as step size, step interval, slew rate, etc.

FIG. 1 is a simplified block diagram of a computing system 100 including a power supply 105 and a load device 110. When the load device 110 connects to the power supply 105, the power supply 105 and load device 110 may exchange messages to indicate what operating modes are supported. In some embodiments, the interconnection between the power supply 105 and the load device 110 may be defined by the USB Type C Specification. The power supply 105 and the load device 110 may operate in accordance with the USB Battery Charging Specification and the Universal Serial Bus Power Delivery Protocol V2.0. The USB PD specification defines default power supply modes that may be supported and also provides a framework for exchanging custom (i.e., proprietary) messages between connected devices. In addition to default modes defined by the appropriate standards, the power supply 105 is capable of implementing customizable current limit parameters, thereby allowing the load device 110 to tailor the current profile of power delivered by the power supply 105. The custom message framework allows the power supply 105 to provide the load device 110 with a wider array of control parameters, such as current limit parameters. Allowing the load device 110 to configure the power supply 105 allows the load device 110 to perform thermal mitigation activities by adjusting the current received from the power supply 105 along a collapsible load line. When the load device 110 draws the agreed-upon current, the output voltage of the power supply 105 is collapsed by the load device 110 to the voltage of the internal battery of the load device 110. In this manner the heat dissipation normally located in the load device 110, created by the linear or switchmode conversion of incoming voltage to battery voltage, is "exported" upstream to the power supply 105, keeping the load device cooler, even at higher charging currents.

FIG. 2A is a block diagram of a collapsible power supply in the system of FIG. 1 that enables continuously variable output current limiting in accordance with some embodiments The power supply 105 includes a filter 200 connected to terminals for receiving an input power signal (e.g., AC or DC voltage) and to filter the incoming signal and provide transient protection. A bridge rectifier 210 rectifies the incoming AC signal. A power conversion controller 215 (e.g., a PWM controller) controls a power transistor 220 (e.g., FET/BJT) to generate a supply voltage at a transformer 225. The transformer 225 acts as an energy storage device that is charged by enabling the power transistor 220 to store current in the inductive coils of the transformer 225 using, for example, a flyback voltage regulation scheme. A rectifier 230 is coupled to the transformer 230. The rectifier 230 may be a passive device or an active synchronous rectifier device. The output of the rectifier 230 is a DC voltage that is provided to a connector 235, which may be a reversible connector (e.g., a USB Type C connector).

Feedback for the power conversion controller 215 is provided by a communication and control (CC) processor 240 having an attached or integrated memory 242. The memory 242 may be a volatile memory (e.g., DRAM, SRAM) or a non-volatile memory (e.g., ROM, flash memory, hard disk, etc.), or some combination thereof. The CC processor 240 receives a measurement of the current provided by the power supply 105 using a current sensor 245 and measures the voltage output by the rectifier 230. A conversion control unit 250 receives one or more digital or analog control signals from the CC processor 240 based on the measured current from the power supply 105 and voltage and transforms those signals to generate an analog or digital control signal for the power conversion controller 215, similar to the feedback path of a PID control loop. An optical isolator 255 provides electrically isolates the CC processor 240 (digital) from the analog power conversion controller 215. Based on the feedback signal, the power conversion controller 215 controls the duty cycle of the power transistor 220 so that the generated current and voltage conform to the mode and any current control parameters selected for the power supply 105. In this class of embodiments, the one or more digital or analog control signals from the CC processor 240 received by the conversion control unit 250 cause optical feedback through the optical isolator 255 which may be granular to the point of being continuously variable in resultant output current limits. That is, output current limiting may be implemented at any arbitrary value, as a function of the control algorithms operant within the CC processor 240 and the transforms embodied within the conversion control unit 250.

During operation, the CC processor monitors the voltage and current delivered by the power supply 105. If the current is below its limit and the load generated by the load device 110 increases, the voltage at the rectifier 230 will drop. The CC processor 240 detects this drop and increases the "drive" signal to the power conversion controller 215. The power conversion controller 215 increases the duty cycle of the power transistor 220 to provide additional current to the transformer 225, thereby causing the voltage to recover and additional current to be provided from the power supply 105 to the load device 110. If the CC processor 240 identifies that the measured current is at the maximum allowable (pre-established) current limit, and the voltage drops, it does not increase the drive signal to the power conversion controller 215. The power supply 105 generates the amount of current associated with the limit, but the voltage drops because the current is limited. Particular circuits for implementing the elements in FIG. 2A are known in the art, and they are not described in detail herein to avoid obscuring the present subject matter.

The CC processor 240 allows dynamic current limits to be configured for the power supply 105. As described in greater detail below in reference to FIG. 3, the CC processor 240 establishes a communication link 260 over the connector 235 with the load device 110 (see FIG. 1) using a custom message framework to allow the load device 110 to configure one or more current limit parameters. In some embodiments, the CC processor 240 changes the current limit in steps when it is reconfigured to control the rate at which the load device 110 sees the increased current. The load device 110 may set these transient parameters itself so it can manage the power supply signal characteristics. Example current control parameters include a current limit, a step size for changes in the current limit, a step interval parameter indicating how much time should elapse between step changes, and a slew rate parameter indicating how quickly the current should change responsive to a step change. If the load device 110 increases the current limit, the power supply 105 may increase the current limit to its new value in steps according to the specified current control step parameters.

FIG. 2B is a block diagram of an alternative embodiment of the collapsible power supply 105 in the system of FIG. 1 enabling retention of output protection mechanisms through fault conditions in accordance with some embodiments. In this embodiment, the transforms implemented by the conversion control unit 250 are re-located to reside adjacent to, or within, the power conversion controller 215. In this embodiment, the conversion control unit 250 employs a finite set of output current limit settings, which can be configured via digital or analog signaling from the CC processor 240 through the optical isolator 255. Further optimization of the power conversion controller 215 permits voltage and current monitoring on the secondary side via real-time monitoring of the primary side flyback node's voltage and current waveforms. While generally able to support only a finite set of selectable output voltage and current limits, this arrangement on the primary side enables the advantages of 1) output protection algorithms and current/voltage modes are retained in the conversion control unit 250 as long as incoming AC power is present, despite short-circuit events on the secondary side which would cause resets and re-starts of processing devices on the secondary side, and 2) reduced overall component costs and space since discrete current monitoring and conversion control circuitry in the secondary side are not needed; these functions reside on the primary side, and may be integrated into the same IC package as the power conversion controller 215.

FIG. 3 is a flow diagram of a method for configuring current parameters of a power supply 105 in accordance with some embodiments. In method block 305, the power supply 105 (e.g., the CC processor 240) exchanges mode information with the connected load device 110 over the communication link 260. Either the power supply 105 or the load device 110 may initiate the query.

In method block 310, the power supply 105 determines if the load device 110 supports current control. If the load device 110 does not support current control in method block 310, a default mode is selected in method block 315. In one embodiment, the power supply 105 supports default or standard modes such as a USB Type C (5V/3 A) mode and/or a Power Delivery Standard mode (5V/5 A). Custom messages are not required to select a default mode. Communication protocols defined by the respective standards may be employed to advertise and select a default or standard mode. To determine if the load device 110 can support current control, either the power supply 105 or the load device 110 may send either standard or custom protocol messaging to the other over the communication link 260. If either device 105, 110 does not respond to such queries, the querying device 105, 110 may assume that the queried device 105, 110 does not support current control. As such, the load device 110 may include information in its configuration data indicating its support of current control mode. This configuration data may be exchanged with the mode information in method block 305.

Upon the determination that the power supply 105 and the load device 110 support current control in method block 310, the power supply 105 advertises its current control parameters to the load device 110 in method block 320 (e.g., in response to a query from the load device 110 or during a configuration exchange when the load device 110 connects to the power supply 105). In some embodiments, the advertised current control parameters may include a current range, a voltage range, a step size range, a step duration range, and a slew rate range. The power supply 105 may also advertise default values for the current control parameters within the specified ranges.

In method block 325, the power supply 105 receives a configuration message from the load device 110 specifying the current control parameters selected based on the supported ranges advertised in method block 320.

In method block 330, the power supply 105 controls the current provided to the load device 110 based on the received current control parameters. As described above, the CC processor 240 limits the current provided to the load device 110 based on the specified current limit parameter.

In method block 335, the CC processor 240 receives new current control parameters from the load device 110 over the communication link 260.

In method block 340, the power supply 105 changes the current limit in steps according to the specified step size, step duration, and slew rate parameters.

When exchanging the custom messages to advertise and configure the current control parameters, the power supply 105 and the load device 110 may exchange acknowledgement messages to indicate that the messages have been received and confirmation messages to indicate that the operations have been implemented (e.g., that the new current limit has been reached).

In addition to current control parameters, the power supply 105 and the load device 110 may also exchange other data over the communication link 260, such as status information, measured current, measured voltage, previous messages and whether the message has been implemented, error messages, etc.

In some embodiments, the power supply 105 may receive a software update from the load device 110 over the communication link 260. For example, the CC processor 240 may store firmware in a portion of the memory 242 (e.g., "Flash" portion) that includes software instructions for implementing the current control or other functions described herein. The load device 110 may send a firmware update using the communication link 260 within the custom message framework. Checksums, security keys, etc., may be used to verify and authenticate the firmware update. The power supply 105 may temporarily disconnect from the load device 110 and install the firmware update. After installing the firmware update, the load device 110 may reconnect to the load device 110 resume providing the power supply signal in accordance with the specified current control parameters.

Allowing the load device 110 to configure the current control settings of the power supply 105 allows the load device 110 to perform thermal mitigation techniques by limiting the amount of current (corresponding to heat) and to control incoming transients for current limit changes by setting the step parameters.

In some embodiments, certain aspects of the techniques described above may implemented by one or more processors of a processing system executing software. The method 300 described herein may be implemented by executing software on a computing device, such as the CC processor 240 of FIG. 2, however, such methods are not abstract in that they improve the operation of the power supply 105. Prior to execution, the software instructions may be transferred from a non-transitory computer readable storage medium to a memory, such as the memory 242 of FIG. 2.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A power supply includes a connector, a power conversion controller to generate a power supply signal at the connector, and a communication and control processor. The communication and control processor is to receive a set of current control parameters including a current limit over a communication link in the connector, receive measurements of current and voltage of the power supply signal, and generate a drive signal for controlling the power conversion controller based on the received current control parameters and the measurements of the current and the voltage.

A method includes generating a power supply signal at a connector of a power supply. A set of current control parameters including a current limit is received in the power supply over a communication link in an external connector of the power supply. Measurements of current and voltage of the power supply signal are generated. The power supply signal is controlled based on the received current control parameters and the measurements of the current and the voltage.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A power supply, comprising:
   a connector;
   a power conversion controller to generate a power supply signal at the connector; and
   a communication and control processor to receive a set of current control parameters including a current limit over a communication link in the connector, receive measurements of current and voltage of the power supply signal, and generate a drive signal for controlling the power conversion controller based on the received current control parameters and the measurements of the current and the voltage.

2. The power supply of claim 1, wherein the communication and control processor is to limit the drive signal responsive to the measured current of the power supply signal meeting the current limit parameter.

3. The power supply of claim 2, wherein the set of current control parameters comprises at least one step parameter, and the communication and control processor is to receive a modified current limit parameter and transition from a current value of the current limit parameter to the modified current limit parameter based on the at least one step parameter.

4. The power supply of claim 3, wherein the at least one step parameter comprises a step size parameter.

5. The power supply of claim 4, wherein the at least one step parameter comprises a step duration parameter.

6. The power supply of claim 5, wherein the at least one step parameter comprises a slew rate parameter.

7. The power supply of claim 1, wherein the communication and control processor is to advertise ranges for values of the current control parameters over the communication link to a connected load device and to receive the set of current control parameters from the connected load device.

8. The power supply of claim 1, wherein the communication and control processor is to communicate status information over the communication link to a connected load device.

9. The power supply of claim 1, wherein the communication and control processor is to control the power conversion controller using a custom mode based on the set of current control parameters or in at least one default mode based on a set of default current control parameters.

10. The power supply of claim 1, further comprising:
    a power transistor coupled to an input power terminal;
    a transformer coupled between the power transistor and the connector, wherein the power conversion controller is to control a duty cycle of the power transistor for storing power in the transformer to generate the power supply signal; and
    a current sensor coupled to the transformer and the communication and control processor to measure the current of the power supply signal.

11. A method, comprising:
    generating a power supply signal at a connector of a power supply;
    receiving a set of current control parameters including a current limit in the power supply over a communication link in the connector;
    generating measurements of current and voltage of the power supply signal, and
    controlling the power supply signal based on the received current control parameters and the measurements of the current and the voltage.

12. The method of claim 11, wherein controlling the power supply signal comprises limiting a current of the power supply signal responsive to the measured current of the power supply signal meeting the current limit parameter.

13. The method of claim 12, wherein the set of current control parameters comprises at least one step parameter, and the method further comprises:
    receiving a modified current limit parameter over the communication link; and
    transitioning from a current value of the current limit parameter to the modified current limit parameter based on the at least one step parameter.

14. The method of claim 13, wherein the at least one step parameter comprises a step size parameter.

15. The method of claim 14, wherein the at least one step parameter comprises a step duration parameter.

16. The method of claim 15, wherein the at least one step parameter comprises a slew rate parameter.

17. The method of claim 11, further comprising:
    advertising ranges for values of the current control parameters over the communication link to a connected load device; and
    receiving the set of current control parameters from the connected load device.

18. The method of claim 11, further comprising sending status information over the communication link to a connected load device.

19. The method of claim 11, further comprising controlling the power supply signal in a custom mode based on the set of current control parameters or in at least one default mode based on a set of default current control parameters.

20. The method of claim 11, wherein the power supply comprises a power conversion controller, a power transistor coupled to an input power terminal, a transformer coupled between the power transistor and the connector, wherein the power conversion controller is to control a duty cycle of the power transistor for storing power in the transformer to generate the power supply signal based on a drive signal, and a current sensor coupled to the transformer to measure the current of the power supply signal, and the method comprises limiting the drive signal responsive to the measured current of the power supply signal meeting the current limit parameter.

* * * * *